US008641050B2

(12) United States Patent
Gardner

(10) Patent No.: US 8,641,050 B2
(45) Date of Patent: Feb. 4, 2014

(54) APPARATUS FOR MOVING A NON-AMBULATORY INDIVIDUAL UP AND DOWN STEPS

(71) Applicant: DMG Enterprises, LLC, Olney, MD (US)

(72) Inventor: Joseph James Gardner, Olney, MD (US)

(73) Assignee: DMG Enterprises, LLC, Olney, MD (US)

( * ) Notice: Subject to any disclaimer, the term of this patent is extended or adjusted under 35 U.S.C. 154(b) by 0 days.

(21) Appl. No.: 13/767,740

(22) Filed: Feb. 14, 2013

(65) Prior Publication Data

US 2013/0207354 A1 Aug. 15, 2013

Related U.S. Application Data

(60) Provisional application No. 61/599,050, filed on Feb. 15, 2012.

(51) Int. Cl.
*B62B 5/02* (2006.01)

(52) U.S. Cl.
USPC .......................................................... 280/5.2

(58) Field of Classification Search
USPC ................................................ 280/5.2, 5.32
See application file for complete search history.

(56) References Cited

U.S. PATENT DOCUMENTS

| | | | | |
|---|---|---|---|---|
| 2,701,005 | A * | 2/1955 | Bennett et al. | 280/5.3 |
| 3,104,112 | A | 9/1963 | Crail | |
| 3,137,511 | A * | 6/1964 | Weil et al. | 280/5.24 |
| 3,196,970 | A | 7/1965 | Brenner | |
| 3,241,848 | A | 3/1966 | Flory | |
| 3,283,839 | A | 11/1966 | Brown et al. | |
| 3,573,877 | A * | 4/1971 | Locke | 280/5.32 |
| 3,580,591 | A * | 5/1971 | Coffey et al. | 280/5.32 |
| 4,044,850 | A | 8/1977 | Winsor | |
| 4,061,199 | A * | 12/1977 | Last | 180/8.2 |
| 4,108,449 | A | 8/1978 | Rhodes | |
| 4,310,167 | A | 1/1982 | McLaurin | |
| 4,455,029 | A | 6/1984 | Taylor | |

(Continued)

FOREIGN PATENT DOCUMENTS

EP 0348171 A2 12/1989

OTHER PUBLICATIONS http://www.google.com/shopping/product/15001011997412249424?qwalker%20with%2, downloaded Jan. 10, 2013.

(Continued)

*Primary Examiner* — Tashiana Adams

(74) *Attorney, Agent, or Firm* — Rothwell, Figg, Ernst & Manbeck PC

(57) ABSTRACT

An apparatus for transporting a non-ambulatory individual up and down steps includes a seat for the non-ambulatory individual, two front wheels and two larger back wheels positioned under the seat. The apparatus can be used to move up steps through an operator by tilting the apparatus back and moving the apparatus such that the large rear wheels roll towards the steps. When descending steps, the seated occupant can be lowered through successive steps to a lower floor or incorporated landing by tilting the apparatus and moving the rear wheels down the steps. The apparatus includes extension rods which may be extended to stabilize the apparatus while moving up or down steps.

12 Claims, 7 Drawing Sheets

(56) References Cited

U.S. PATENT DOCUMENTS

| | | | | | |
|---|---|---|---|---|---|
| 4,512,588 | A | | 4/1985 | Cox | |
| 4,618,155 | A | | 10/1986 | Jayne | |
| 4,671,369 | A | | 6/1987 | Tiffin et al. | |
| 4,771,839 | A | | 9/1988 | Misawa | |
| 4,781,413 | A | | 11/1988 | Shumack, Jr. | |
| 4,794,999 | A | | 1/1989 | Hester | |
| 4,811,966 | A | | 3/1989 | Singleton | |
| 4,892,323 | A | | 1/1990 | Oxford | |
| 5,149,118 | A | | 9/1992 | Oxford | |
| 5,158,309 | A | | 10/1992 | Quigg | |
| 5,228,709 | A | * | 7/1993 | Kao | 280/250.1 |
| 5,269,544 | A | | 12/1993 | Park | |
| 5,511,802 | A | | 4/1996 | Aitken | |
| 5,634,650 | A | | 6/1997 | Hensler, Sr. et al. | |
| 5,711,044 | A | | 1/1998 | Newman et al. | |
| 5,782,483 | A | | 7/1998 | Rogers et al. | |
| 5,788,659 | A | | 8/1998 | Haas | |
| 6,129,165 | A | | 10/2000 | Schaffner et al. | |
| 6,360,833 | B1 | | 3/2002 | Valencia | |
| 6,435,538 | B2 | | 8/2002 | Ellis et al. | |
| 6,644,675 | B2 | | 11/2003 | Ellis et al. | |
| 7,007,956 | B1 | | 3/2006 | Pinon | |
| 7,125,022 | B2 | | 10/2006 | Medina | |
| 7,219,755 | B2 | | 5/2007 | Goertzen et al. | |
| 7,484,737 | B2 | | 2/2009 | Satorius | |
| 7,506,878 | B2 | | 3/2009 | Feick | |
| 7,520,347 | B2 | | 4/2009 | Chambliss et al. | |
| 7,597,163 | B2 | | 10/2009 | Goertzen et al. | |
| 2005/0156404 | A1 | | 7/2005 | Lauren et al. | |
| 2005/0161916 | A1 | | 7/2005 | Taylor | |
| 2008/0315549 | A1 | | 12/2008 | Dougherty | |
| 2012/0074668 | A1 | | 3/2012 | Braaten | |

OTHER PUBLICATIONS http://l.yimg.com/ck/image/A2523/2523266/300_2523266.jpg, downloaded Jan. 15, 2013.

http://images1.hellotrade.com/data2/JH/BG/HELLOTD-1711982/s-max_gr_250×250.jpg, downloaded Jan. 15, 2013.

http://www.disabilityindia.com/images/awc.jpg, downloaded Jan. 15, 2013.

http://2.bp.blogspot.com/-r3cnAjDq1Lc/T3ANMzUAhgl/AAAAAAAAAH4/lxS50_yOV, downloaded Jan. 15, 2013.

* cited by examiner

APPARATUS FOR MOVING A NON-AMBULATORY INDIVIDUAL UP AND DOWN STEPS

CROSS-REFERENCE TO RELATED APPLICATIONS

This application claims priority to U.S. Provisional Application No. 61/599,050, filed Feb. 15, 2012, the entire disclosure of which is incorporated herein by reference.

FIELD OF THE INVENTION

The present invention is to be utilized by individuals with any number of differing disabilities to navigate areas heretofore restricted.

BACKGROUND OF THE INVENTION

The apparatus incorporates a number of novel innovations that permit it to be used in many modes herein described. It is not limited to just these methods but can be implemented as a mobility aide for any circumstance that may present itself. It can be used as a walker, to duplicate a regular wheelchair's functionality, as a beach wheelchair, as a stair ascension and descending device or as a means to easily transport someone up or down a vertical wall (as into a small boat from a dock where the two deck planes are separated by many feet). Each of these operating modes are possible without having to transform or convert the apparatus's structural design in any manner. It is a manual piece of equipment that can be used by a single caregiver to raise the non-walker up any and all stair designs. This will include stairs both inside and outside a residence, staircases with landings too small for a wheelchair, that require negotiating a 90 degree change of direction, a commercial establishment, or even a spiral staircase. Staircases that do not conform to present day measurement standards are easily navigated as well. The apparatus can duplicate a common wheelchair function that will also permit anyone who cannot walk to be pushed virtually anywhere. Rough terrain such as grassy fields, uneven sidewalks, pavements and curbs, sandy beaches or any other such impasse areas are no problem for this apparatus. A person who requires the use of a walker can use this appliance for that function until tired, sit and rest or allow themselves to be pushed. The construction is such that this new apparatus can be adjusted at time of manufacture to perfectly accommodate an individual's height and weight, or the apparatus can be manufactured with adaptations that allow field adjustments.

SUMMARY OF THE INVENTION

According to one aspect of the present invention a stair climbing option is provided. The apparatus, with a seated occupant, can be elevated through successive steps to a higher floor or incorporated landing. In the reverse method the seated occupant can be lowered through successive steps to a lower floor or incorporated landing. A single operator can successfully elevate an individual seated in the apparatus. The orientation is such that the seated person is on the seat with his/her back towards the closed end and his/her legs in the open end of the apparatus, facing toward the lower starting level.

The apparatus for moving a non-ambulatory individual up and down stairs is comprised of a U-shaped framework similar to a walker—open on one end to permit a person to use as a walker. The U-Shaped frame sides 100 and 200 are mirror images of each other. They each consist of 4 short horizontal support bars 3, 4, 31 and 32 assembled and may be connected to two longer vertical support bars, in the shape of a rectangular frame. These frames are then connected to each other with a parallel orientation using transverse connections such as back top support bar 9, a seat stabilizing bar 11, a back auxiliary support bar 33, and an axle shaft 13 with bearings 14 positioned at the proper height for the back wheels 5.

A seat 10 is attached to the framework by hanging the seat from the each side top support bar 32 with a chain 12 and clevis assembly 30. There may be a seat hook 50 attached to one side of the back top support bar 9 to provide a means to secure the seat in an upright position.

The middle of the back top support bar 9 may include a releasable connection element, such as, a safety clevis 8 and a safety belt 7 may be connected to the clevis 8.

Attached to each U-shaped frame 100 and 200 and oriented toward the back of the frames is a rod control assembly 110 that provides a means to extend and retract an extension rod 19 from a stabilizing cylinder 18. Each assembly consists of a control cable 20 connected to control cable release handle 23 on one end and the extension rod locking pin 21 on the other end. The rod locking pin 21 is held in place by means of a spring 22.

The transport apparatus may also include a brake means for an individual to hold the unit in place when used as a walker. This brake assembly consists of a front wheel brake handle and a brake lever assembly connected by a front wheel brake cable. Multiple manufacturing adaptations previously known to the industry can be utilized to allow the device to be partially disassembled and/or folded from a storage configuration to a transport configuration and vise-versa.

Dimensionally, the transport apparatus keeps a very small footprint. In this respect, the amount of floor space that it occupies is about the same size as a regular walker. In an embodiment of the present invention, the front to back wheelbase center lines will be about 14" and the overall length at approximately 27". Total overall width may be restricted to approximately 22", which provides ample space for a normal 18" seat width and allows the device to fit through a 24" doorway, the width of most older bathroom doors. The apparatus has strategically placed support bars that are used to secure the individual components necessary for the other functions at their precise locations.

There are two oversized low pressure pneumatic tires 5 attached by a right side frame to left side frame spanning axle 13 and bearing arrangement on the closed end of the equipment. There are two smaller wheels 6, which may be pneumatic tires, attached via a short shaft individually to the bottom of each vertical frame member on the open end of the transport apparatus.

There is a foldable seat 10 on the interior of the framework attached to the topmost frame components on either side via means of a hanging mechanism—such as a bosun's chair. The seat is capable of either hanging rigidly in a horizontal plane orientation, such that an individual may sit on it, or being pivoted and latched onto the frame on the closed end and held in an upright plane orientation, such that the apparatus may be used as a walker.

On each side of the framework and attached in a vertical orientation to the strategically placed support bars is a cylinder 18 with an extension rod 19 concealed internally in each cylinder, and each extension rod 19 may be deployed through an opening in the bottom of the cylinder 18. The deployment of each rod 19 is controlled by the caregiver who is operating the transport apparatus.

When the seat is held horizontally, a person with impaired walking abilities can sit on the seat. In this orientation the device has several options for usage. A caregiver can push the transport apparatus from behind in a manner similar to that of a transfer wheelchair. However, the apparatus' small footprint allows it to navigate passages and doorways that a normal wheelchair cannot navigate. The apparatus' all terrain tires allow it to transport individuals over very rough ground. Because the back hemisphere of each large tire protrudes behind the frame work by a substantial distance (e.g., about 8"), two individuals can support it—one beneath and holding the extended cylinder rod 19 and one above holding the top handle 32—and "walk" the device down a vertical wall—as would be necessary to place the person in a boat from a floating dock. Or it can be used as chair for resting purposes. Most importantly, in this orientation the apparatus can be utilized as a manual, single operator, stair climbing device. As a stair climber it can navigate stairs that conform to the guidelines from the 2006 International Building Code for both commercial buildings and common stairs in residential buildings and, in addition, stairs in older dwellings that were built before standards were initiated. Typical riser heights for stairs range from a minimum of 4" to a maximum of 7.75". Typical tread depth dimensions are 10" to 11". This is a wide range for a mechanism to accommodate but the large tires will always provide inclined plane advantages and easily roll over all stairs. There are other dimensions for spiral stairs, aisle stairs and incline stairs. The present invention will successfully navigate all these dimensioned stairs due to its innovative approach. Spiral stairs are user-friendly due to the unique ability of the invention to pivot rotationally around either vertical rear wheel center.

With the seat rotated to its vertical position and locked in place an ambulatory individual can used it for balance as they walk. With its larger tires it can proceed over terrain not fitted for a walker with small diameter wheels or glider pads.

While the motivation for usage is primarily directed at everyday assistance for either non-walkers or impaired walkers it is also well-suited for building emergency evacuations, and similar instances, when elevators are either not present, not operational or not advised for use.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION OF THE PREFERRED EMBODIMENTS

Figure 1:
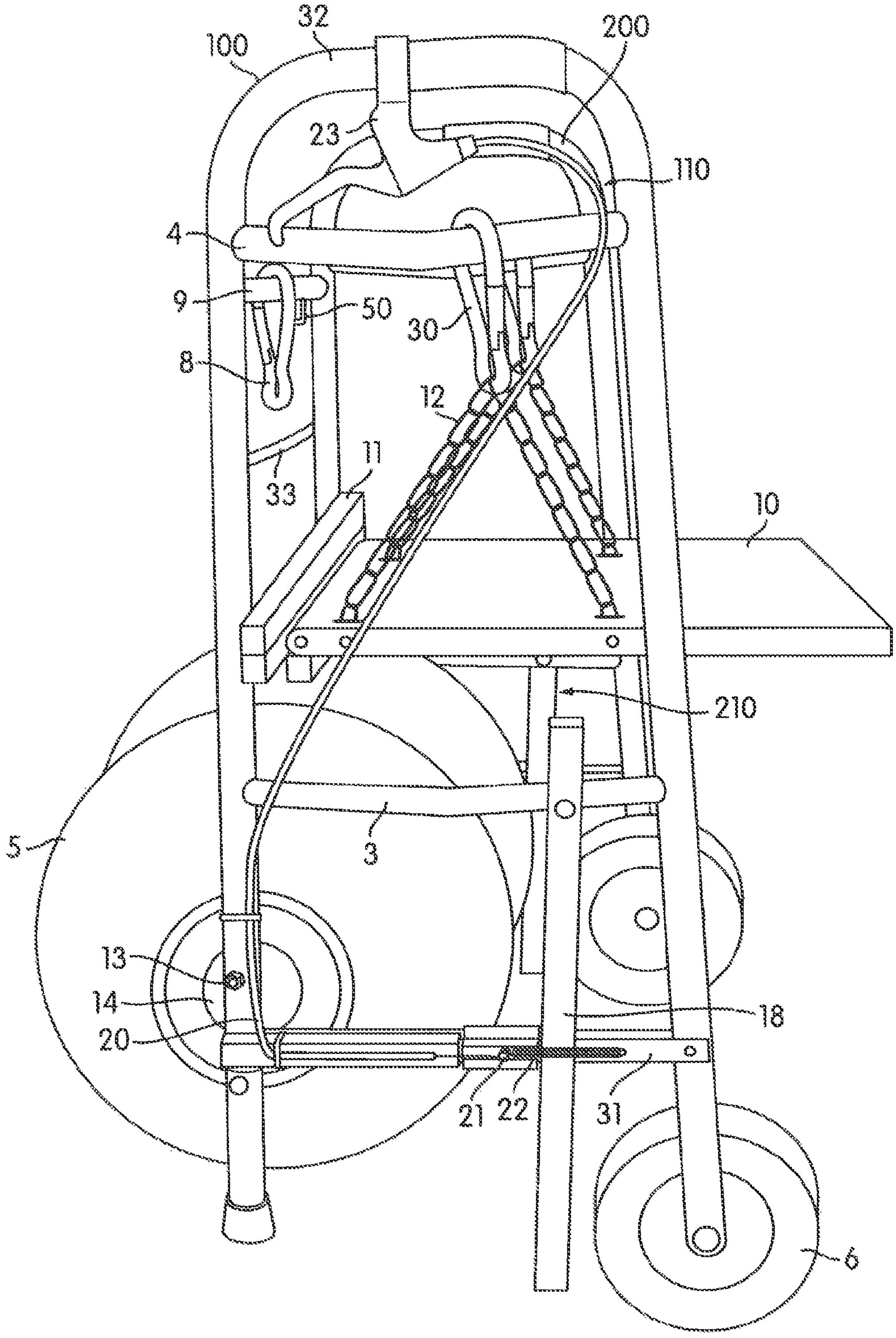
FIG. 1 illustrates a perspective view of an apparatus for moving a non-ambulatory individual up and down steps according to an embodiment of the present invention.
Figure 2:
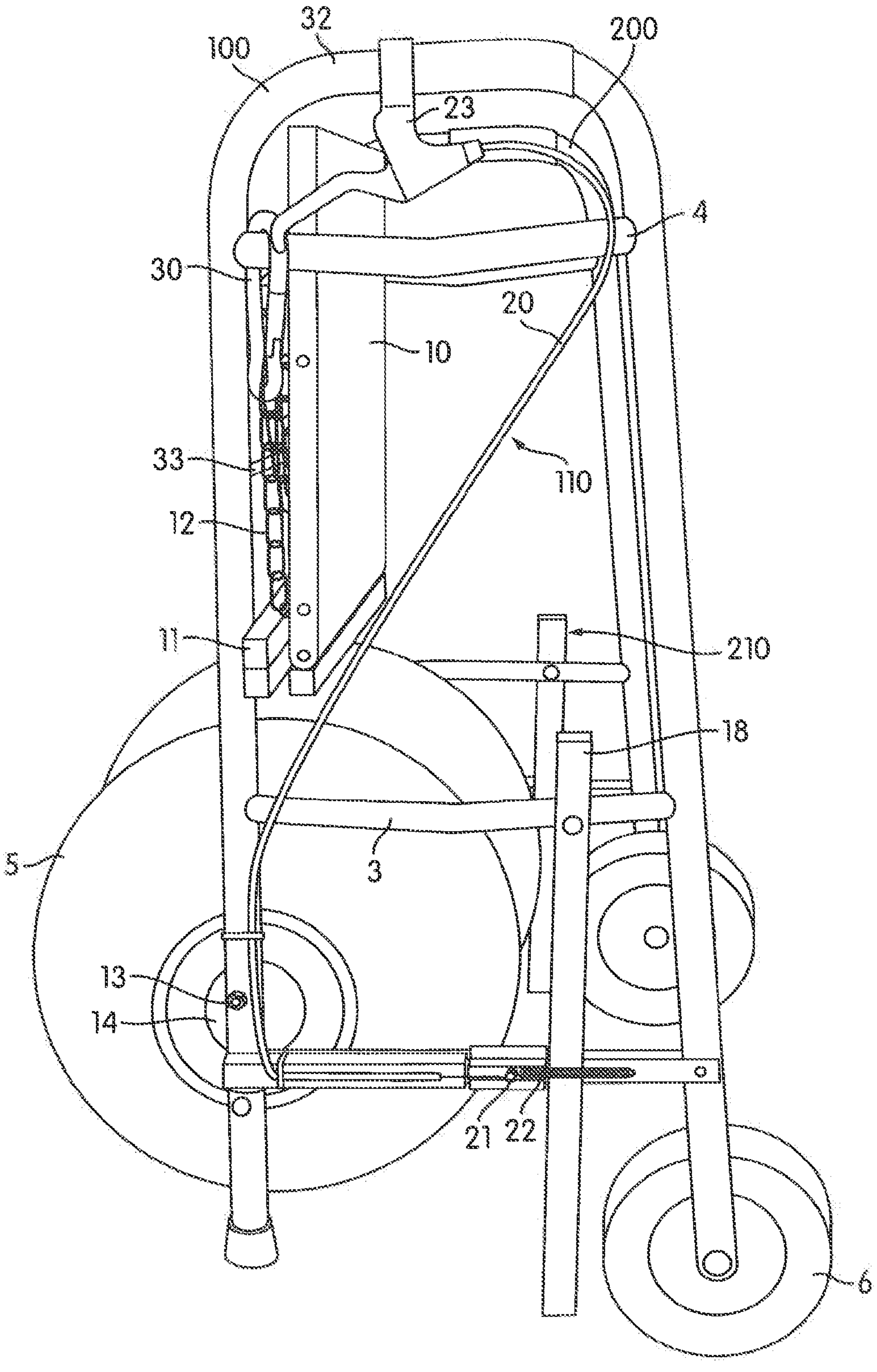
FIG. 2 illustrates a perspective view of the apparatus in a walker configuration with a seat in an upright position according to an embodiment of the present invention.

FIGS. 1 and 2 illustrate an apparatus for moving a non-ambulatory individual up and down steps according to an embodiment of the present invention. The apparatus includes a first side frame 100 and a second side frame 200, which, in one embodiment, may be U-shaped. The frames 100 and 200 are mirror images of each other, and each include side top support bar 32, first side support bar 4, second side support bar 3 and bottom side support bar 31. The side frame 100 is coupled to the side frame 200 by a back top support bar 9 and a back auxiliary support bar 33. The apparatus includes a seat assembly including a seat 10, a chain 12, a chain connection element, such as a clevis 30, and seat stabilizing bar 11. The seat 10 is supported by a set of chains 12 coupled to the first support bar 4 of each frame by a clevis 30 or other connection element. The first support bar 4 may include protrusions to maintain the clevis 30 in a desired position. The seat 10 is movable between a horizontal position, as illustrated in FIG. 1, and an upright position in which the seat is coupled to the seat hook 50, as illustrated in FIG. 2. In the horizontal position, a person (occupant) may sit on the seat 10, and the seat is stabilized by the seat stabilizing bar 11. In the upright position, a person may use the device as a walker and grip the top support bar 32 of each side frame 100 and 200. A front wheel 6 is rotatably coupled at the bottom front portion of each side frame 100 and 200. A set of rear wheels 5 are coupled to a rear axle 13 (see FIG. 4) extending between the side frames 100 and 200 in the rear. Front wheels 6 and rear wheels 5 are preferably mounted on the inside of each frame 100, 200 to minimize the footprint size of the apparatus. The rear wheels 5 may be coupled to the rear axle 13 by bearings 14. The rear wheels 5 are positioned such that a substantial portion of each wheel 5 is positioned under the seat assembly, specifically the seat stabilizing bar 11 and seat 10. The position of the rear wheels 5, in a fore and aft direction, is approximately under, or relatively close to, the center of gravity of the occupant of the apparatus, which allows that apparatus to be pivoted in a circular motion around the vertical center line of either back tire for enhanced maneuverability on stairs of any type (e.g., spiral and winder) and on landings within staircases. In a working position, i.e., when the apparatus is tilted rearwardly, the center of gravity of the occupant is directly over the rear wheels 5, which allows for the weight of the occupant to be totally supported by the rear wheels 5 with minimal effort by the operator. In one embodiment, the rear wheels 5 each have a diameter that is at least double the diameter of each of the front wheels 6.

Figure 5:
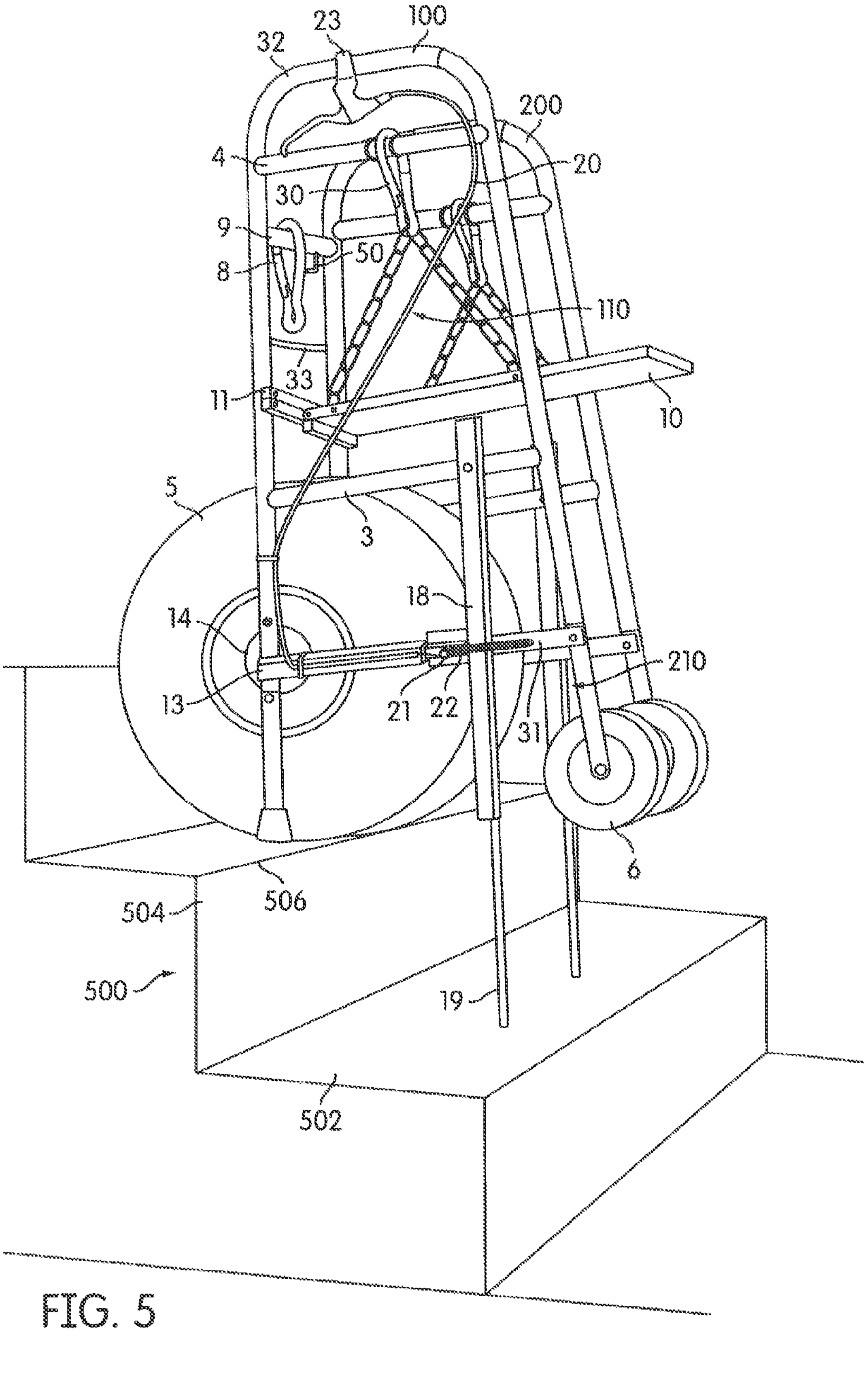
FIG. 5 illustrates a perspective view of the apparatus with extended rods according to an embodiment of the present invention.

In a typical configuration of a staircase, each stair 500 has a tread 502, a riser 504, a nose 506 at the top of the riser 504, and a pitch defined by the angle between a line extending between the nose of consecutive steps and the tread 502 (see FIG. 5). In one embodiment, each rear wheel 5 has a radius that is less than the depth of the tread 502 and greater than the height of the riser 504. With such a diameter, the bottom of each rear wheel 5 is supported on a tread 502 of the stair with a rear portion of the wheel 5 protruding behind frames 100, 200 simultaneously contacting the nose 506 at a point at or below the center of the wheel 5. This is advantageous because the tread 502 will support the weight of the apparatus and the occupant and the operator will be able to apply a force that is parallel to the pitch of the stairs, rather than having to pull the apparatus up over the nose 506 and then in the direction of the tread 502, as would be the case if the rear wheels 5 contacted the riser 504 instead of the nose 506 at a point at or below the center of the wheel 5, or support the weight of the apparatus and occupant the entire time, as would be the case if the radius of the wheels 5 was larger than the depth of the tread 502.

Figure 3:
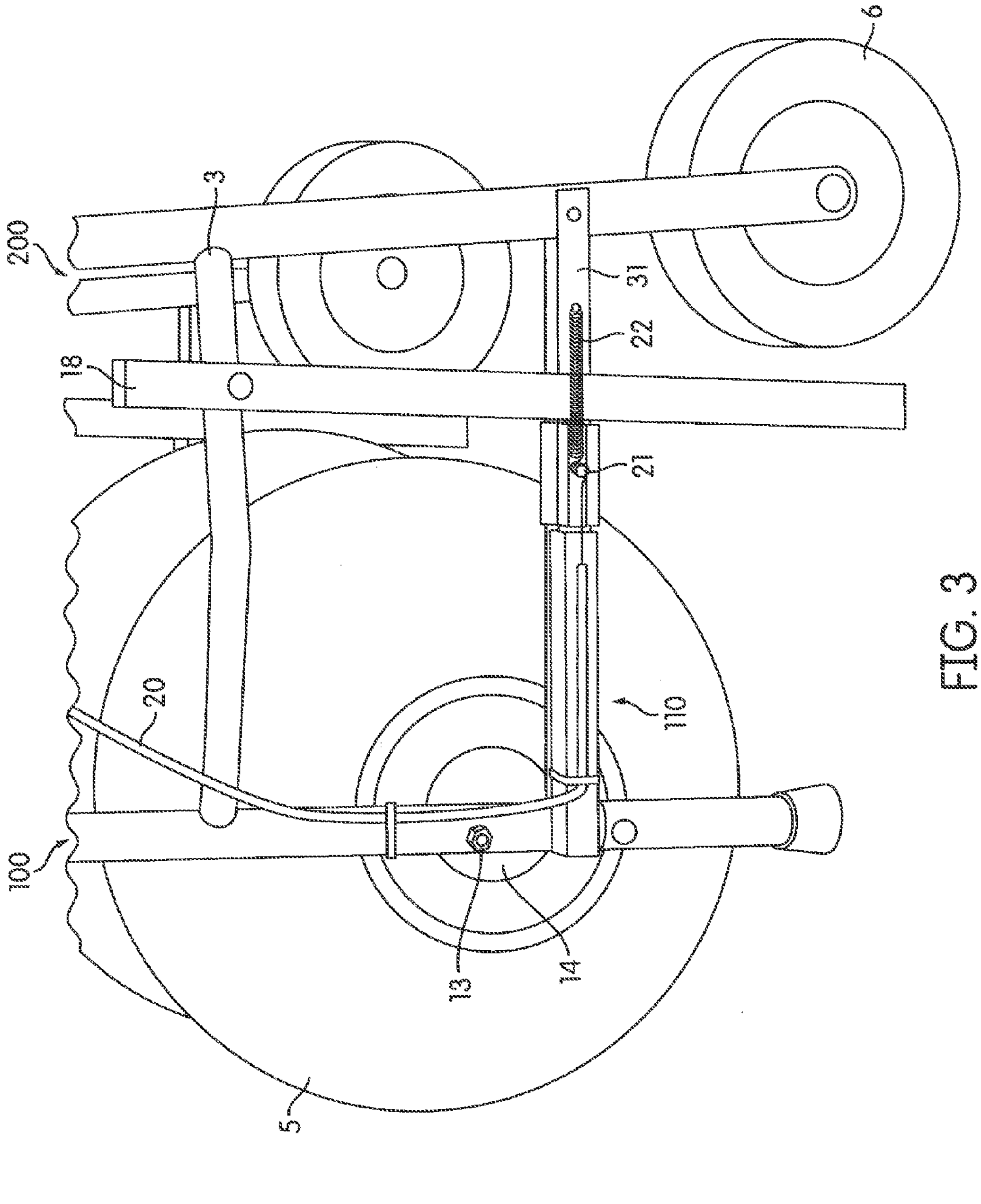
FIG. 3 illustrates a perspective view of the wheels and extendible rod of the apparatus according to an embodiment of the present invention.

FIG. 3 illustrates a detailed perspective view of the lower portion of the apparatus according to an embodiment of the present invention. Each side frame 100 and 200 includes an extendible rod assembly including a control cable release handle 23 (FIGS. 1 and 2) coupled to an extension rod locking pin 21 by a control cable 20. The extension rod locking pin 21 is biased in a locked position by a spring 22, and it is configured to lock the extension rod 19 in the stabilizing cylinder 18. The stabilizing cylinder 18 is coupled to the bottom side support bar 31 and the second side support bar 3. As discussed below with reference to FIG. 5, the extension rod 19 may be released from the stabilizing cylinder 18 by manipulating the control cable release handle 23 when the apparatus is tilted at the beginning of an ascent or descent. In an embodiment of the present invention, the distance between the center of the rear wheels 5 (axle 13) and the stabilizing cylinders 18 is less than the depth of a stair tread 502. This allows the rods 19 to be extended from the cylinders 18 to contact the tread 502 of a stair while the rear wheels 5 are contacting the tread 502 of a higher stair (as illustrated in FIG. 5), which allows the apparatus to safely maintain a stable orientation.

Figure 4:
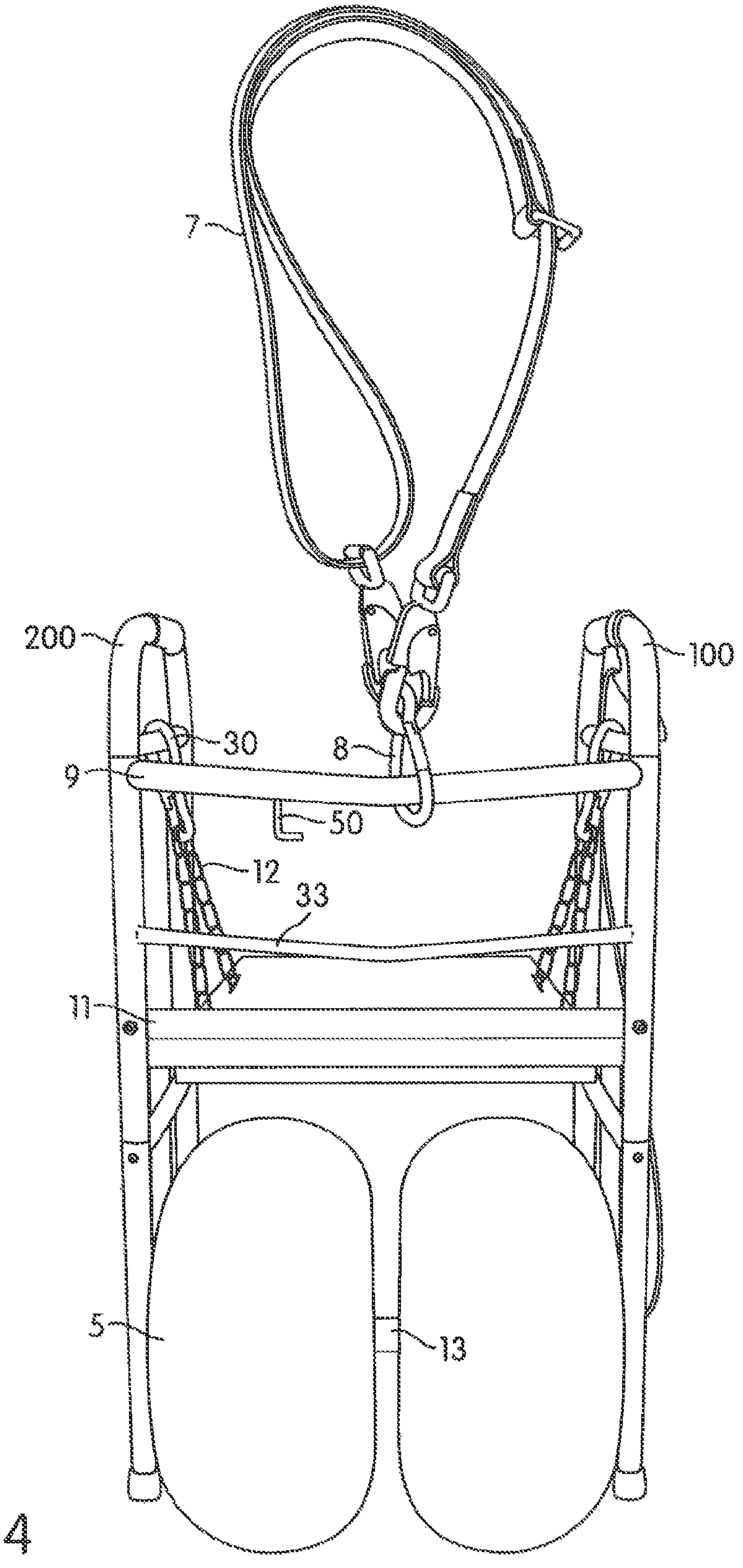
FIG. 4 illustrates a rear view of the apparatus including a safety belt according to an embodiment of the present invention.
Figure 6:
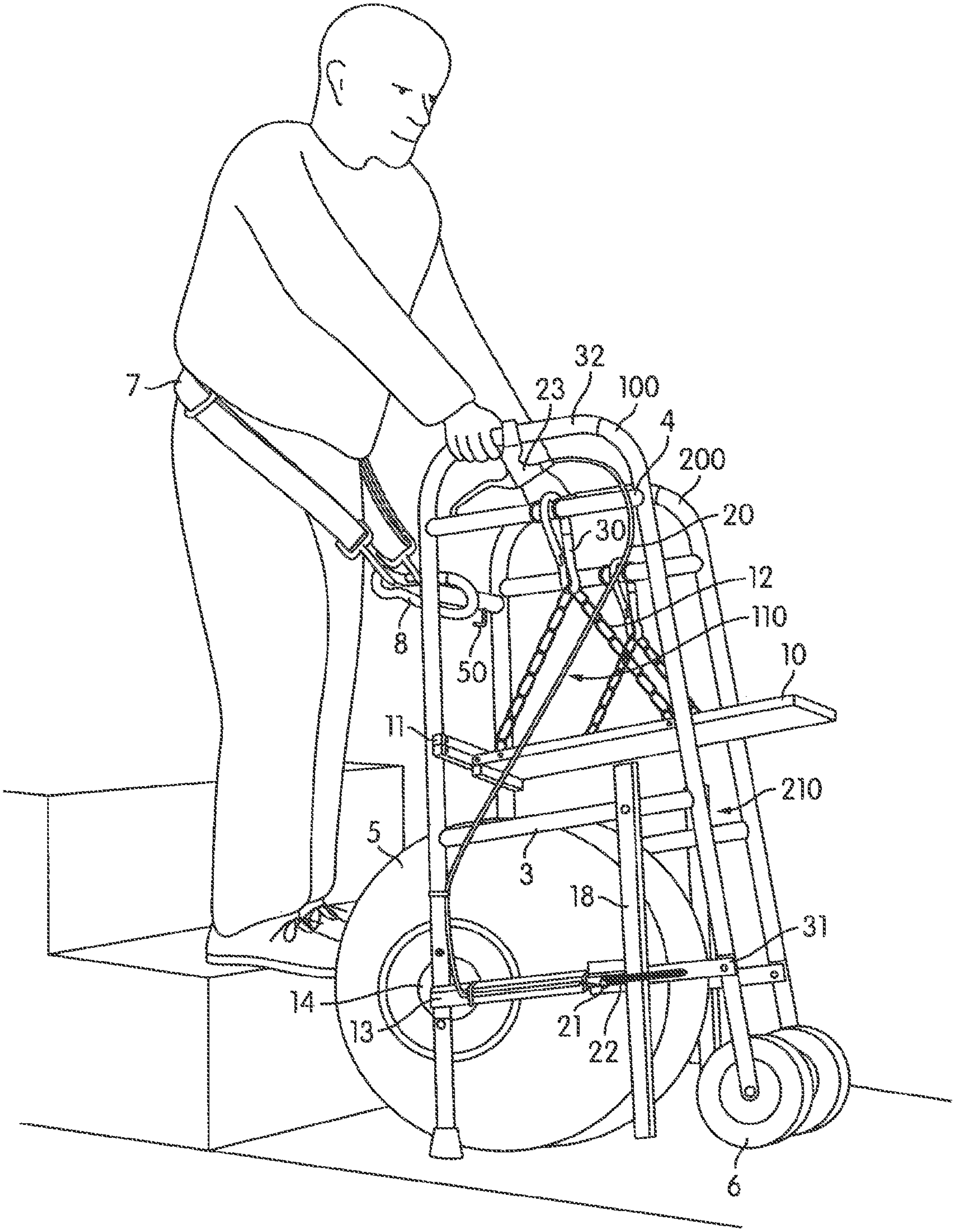
FIG. 6 illustrates a perspective view of an operator using the apparatus according to an embodiment of the present invention.

FIG. 4 illustrates a rear view of an apparatus including a safety belt according to an embodiment of the present invention. The apparatus may include a safety belt 7 coupled to the apparatus by a clevis 8 or other releaseable attachment element. The safety belt 7 may be coupled to the apparatus via the top support bar 9. The safety belt 7 is configured to be worn by an operator (as can be seen in FIG. 6), such as by being positioned around the waist of the operator. In an embodiment of the present invention, the safety belt 7 may be a harness that covers the operator's back and shoulders. As can be seen in the embodiment shown in FIG. 4, each of the rear wheels 5 is located beneath the seat 10.

FIG. 5 illustrates a perspective view of the apparatus with extended rods according to an embodiment of the present invention. As shown, each rod 19 has been extended from its respective cylinder 18 such that the rods 19 contacts the tread 502 of a stair lower than the stair on which the rear wheels 5 of the apparatus are positioned. The rods 19 may be unlocked by manipulating the cable control release handle 23, which causes the cable 20 to move the locking pin 21 into an unlocked position. In an unlocked position, the rods 19 are able to move freely relative to the cylinders 18, such that the rods 19 will extend from the cylinders 18 (e.g., by falling under the force of gravity) until contacting a surface, such as a stair tread 502 or a landing. An operator may lock the rods 19 in place by releasing the cable control release handle 23, and the spring 22 moves the locking pin 21 back into a locked position. In an embodiment of the present invention, each rod 19 includes a plurality of holes or notches, and the locking pin 21 engages a hole or notch in the rod 19 to lock it in place. When the rods 19 are locked, they are configured to stably support at least a portion of the weight of the apparatus and the occupant. In operation, the apparatus may be stabilized while ascending and descending stairs by extending the rods 19 to contact the tread 502 of a stair lower than the stair on which the rear wheels 5 are contacting a tread 502 of a stair, and the rear wheels 5 and the rods 19 will stably support the entire weight of the apparatus and the occupant in this configuration. The rods 19 may be pushed back into the cylinders 18 by releasing the locking pin 21 when the apparatus is on level ground, thereby pushing the rod 19 back into the cylinder 18. The locking pin 21 can then be allowed to extend and lock the rods 19 in their retracted positions within the cylinders 18.

FIG. 6 illustrates a perspective view of an operator using an apparatus according to an embodiment of the present invention. The operator may position the safety belt 7 around his/her waist and connect it to the apparatus via the clevis 8. The operator then grips the top support bar 32 of each side frame 100 and 200 to move the apparatus.

Figure 7:
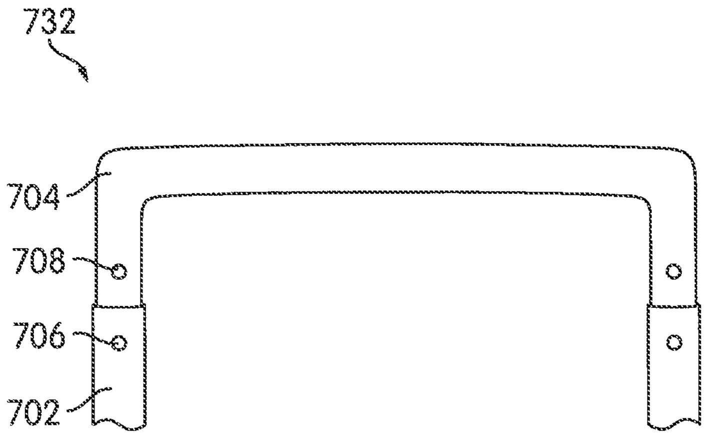
FIG. 7 illustrates a front view of a telescoping upper handle for the apparatus according to an embodiment of the present invention.

FIG. 7 illustrates a top support bar for an apparatus according to an embodiment of the present invention. The adjustable top support bar 732 may be used in place of the fixed top support bar 32 in the side frames 100 and 200. The adjustable top support bar 732 includes a base member 702 and a telescoping member 704. The telescoping member 704 is housed within the base member 702 and is configured to move relative to the base member 702. The base member 702 includes an opening 706 and the telescoping member 704 includes a plurality of openings 708. The telescoping member 704 may be locked in a position relative to the base member by engaging the opening 706 of the base member and one of the plurality of openings 708 of the telescoping member with a locking member. The adjustable top support bar 732 allows the height of the side frames 100 and 200 to be adjusted, which makes it easier for taller operators to move the apparatus.

Figure 8:
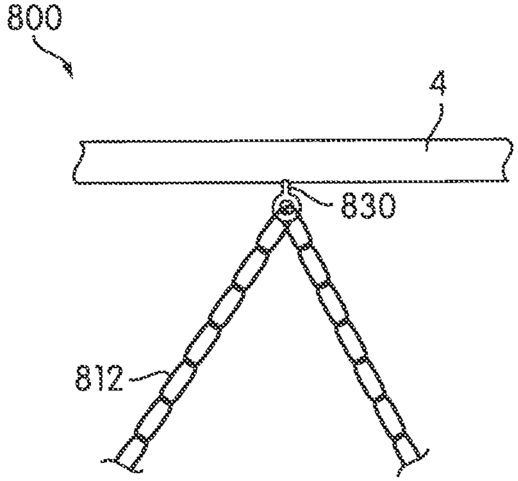
FIG. 8 illustrates a side view of a seat support for the apparatus according to an embodiment of the present invention.

FIG. 8 illustrates a side view of a seat support for an apparatus according to an embodiment of the present invention. In an embodiment of the present invention, the seat support assembly 800 may include a member 830 fixed to the first side support member 4. The chain 812 coupled to the seat 10 extends through the member 830, and the member 830 and chain 812 support the weight of the seat 10. The member 830 may be an eye bolt.

In operation, the single operator is standing behind the occupant grasping the top handle of the apparatus and facing the same direction as the occupant. It is also possible to utilize two operators with this device. In this instance the second operator would be on the lower side of the stairs, facing the occupant (opposite the direction as the first operator and the occupant), and assist in stabilizing the device through each successive step in both the up and down directions by holding the extension rod 19.

The following parts and procedures are incorporated into this operation. Procedurally the operator will grasp the back top support bar 32. He will then pull the apparatus backward and rotate the apparatus around the axle 13 until it is tilted back, preferably at an angle of approximately equal to the pitch of the stairs, for example between 32° and 47°. He will then walk backwards, pulling the apparatus and maintaining its backward tilt. The operator will step up and pull the apparatus until the rear wheels 5 contact the nose of the tread of the first step. At this point the operator will deploy the extension rod 19 to contact the landing below the first step. In an alternative embodiment of the present invention, the extension rod 19 may include a stop that only allows it to be extended a predetermined length (e.g., the height of a stair riser 504) and include only two openings for a retracted position and an extended position. In operation, when the apparatus is tilted, the extension rod 19 is deployed until the stop prevents it from moving farther and the extended position opening is engaged.

As depicted in FIG. 3, a locking means is provided to control the retractable extension rod 19. The extension rod 19 has two purposes for stair climbing. With a single caregiver operating the device, the rod 19 is suitably engineered and fabricated so that, when extended, it will contact the stair tread below the tread occupied by the rear tires. This configuration leaves the occupant of the apparatus in a level orientation, and all of the weight of the apparatus and the occupant is supported on four points, each back wheel and each extension rod. In this configuration, a single operator can release his weight control of the apparatus and reposition his stance to the succeeding higher stair prior to tilting the apparatus back and rolling up to the next step. The control cable release handle 23 is configured to pull the control cable 20, which actuates the locking pin 21 in such a manner that the extension rod 19 enclosed in the stabilizing support cylinder 18 is released to extend through the opening in the support cylinder and drop into its working position. Releasing the control cable release handle 23 locks the rod 19 into place.

After deployment of the extension rod 19, the operator will maintain the back tilt, grip the top support bar 32, and reposition his/her feet onto the next step. Leaning slightly forward the operator will pull the apparatus towards him/her and along the pitch line. The rear wheels 5, which were on the landing, will roll over the nose of the landing and advance up to the first step. Now the operator can allow the apparatus to return to a vertical position by placing the extension rods 19 onto the bottom landing. The apparatus will be supported in this basic seated orientation. Now the operator can move his/her feet up one more step, tilt the apparatus back and repeat the above process for each succeeding step until the top landing is reached. If there is a second operator there may be no need to set the apparatus down at each step and allow the extension rods 19 to carry the weight as the operator moves to the next step. The second operator can grasp the extension rods 19 on each side and hold the apparatus in the tilted position as the first operator moves up incrementally. When the top landing has been achieved and the operator is leaning the apparatus forward to return to the normal position he will simultaneously pull the control cable release handle 23 and the extension rod 19 will be unlocked from the extended position, and, as the apparatus is set down, the rod 19 will be pushed back up into the cylinder 18 and locked in there.

Descending the steps is a repeat of the stair climbing procedure in reverse. The apparatus and its occupant may be coupled to the first operator by the means of a safety belt 7—this step can also be performed in the stair climbing process. The safety belt 7 is placed around the torso of the operator and connected to the safety clevis 8 located on the back bop support bar 9, as can be seen in FIG. 6. As the operator approaches the last step in the up direction from the upper landing he will tilt the apparatus back and pull the control cable release handle 23 as before to extend the rods 19. Controlling the weight with his/her body by holding back against the belt 7, he/she will roll the tires over the top landing and down onto the top step. The operator's hands are only needed to balance the apparatus, and are not used to support the actual weight of the apparatus and occupant. The operator can then lean the apparatus forward until the extension rods 19 contact the second stair from the top and set the apparatus correctly. The control cable release handle 23 is then released to lock the rods 19 in place. In the alternative embodiment of the present invention in which the extension rod includes a stop that only allows it to be extended a predetermined length, when the apparatus is tilted over the last step, the extension rod 19 may be deployed until the stop prevents it from moving farther and the extended position opening is engaged. The operator will then reposition one of his/her feet beside one of the rear wheels 5, tilt the apparatus back, and roll it over the stair lip and down onto the next step. This process is repeated until the apparatus reaches the bottom landing, where the operator pulls the release handle 23 simultaneous to setting the apparatus down to retract the extension rods 19. Again, a second operator can be used to help control the apparatus on the downhill side by holding onto the extension rods 19.

Another aspect of the invention is incorporated in its ability to be utilized as a conventional walker by a person with ambulatory and balance problems. The seat can be lifted and locked to the seat hook 50 on the back top support bar 9 to create clearance for the legs of an operator as he/she walks. The seat can be seen in a lifted position in FIG. 2. This aspect and its small footprint permit that individual to move around a single floor dwelling layout unassisted. A front wheel brake will allow the user to stop the unit as desired.

Another aspect is its ability to be used as a transport chair. The individual can sit on the seat 10 and the caretaker can use the invention as a means to maneuver the individual anywhere. Any office or business with limited width walk spaces is perfect for this application. With the oversized rear tires 5 it can be used for any and all outdoor activities. An athletic activity on the outdoor fields can be attended easily using this device to traverse the grass and dirt. Moving across a sandy area such as a beach is also very possible.

While the present invention has been described and shown in considerable detail with reference to certain illustrative embodiments, including various combinations and sub-combinations of features, those skilled in the art will readily appreciate other embodiments and variations and modifications thereof as encompassed within the scope of the present invention. Moreover, the descriptions of such embodiments, combinations, and sub-combinations is not intended to convey that the invention requires features or combinations of features other than those expressly recited in the claims. Accordingly, the present invention is deemed to include all modifications and variations encompassed within the spirit and scope of the following appended claims.

I claim:

1. An apparatus configured to enable an operator to move an occupant of the apparatus up or down steps, comprising:

a frame including a first side frame, a second side frame, and an upper handle, wherein the first side frame is coupled to the second side frame by at least one back support bar;

a safety belt coupled to the frame and configured to be worn by an operator to stabilize the apparatus during transport;

a seat coupled to the frame between the first side frame and the second side frame;

a first front tire and a second front tire, wherein the first front tire is rotatably coupled to a front inner portion of the first side frame and the second front tire is rotatably coupled to a front inner portion of the second side frame;

two rear tires positioned such that at least a portion of each tire is positioned under the seat, wherein each of the two rear tires has a diameter at least double a diameter of each of the first and second front tires;

a first extendible rod coupled to the first side frame and positioned between the first front tire and the rear tires, said first extendible rod being configured to be movable in a generally vertical direction between a retracted position in which a bottom tip of the rod is at or above the bottoms of the front and rear tires and an extended position in which the bottom tip of the rod extends below the below the bottoms of the front and rear tires;

a second extendible rod coupled to the second side frame and positioned between the second front tire and the rear tires, said second extendible rod being configured to be movable in a generally vertical direction between a retracted position in which a bottom tip of the rod is at or above the bottoms of the front and rear tires and an extended position in which the bottom tip of the rod extends below the below the bottoms of the front and rear tires; and a rod control device configured to enable an operator of the apparatus to control movement of the first and second extendible rods between their respective retracted and extended positions.

2. The apparatus of claim 1, wherein the apparatus is configured to be used on a plurality of stairs, each stair including a tread, a riser and a nose at a top of the riser, and each rear tire includes a radius that is less than a length of the stair tread and greater than a height of the stair nose.

3. The apparatus of claim 2, wherein a distance between a center of the rear tires and the first extendible rod is less than the length of the stair tread and a distance between a center of the rear tires and the second extendible rod is less than the length of the stair tread.

4. The apparatus of claim 1, wherein the first extendible rod includes a first cylinder and a first rod housed within the first cylinder and the second extendible rod includes a second cylinder and a second rod housed within the second cylinder.

5. The apparatus of claim 4, wherein the rod control device comprises a rod control handle coupled to the upper handle of the first side frame, wherein the rod control handle is configured to control movement of the first rod relative to the first cylinder and the second rod relative to the second cylinder.

6. The apparatus of claim 5, wherein the rod control handle is coupled to a first locking pin by a first rod control cable and the rod control handle is coupled to a second locking pin by a second control cable, wherein the rod control handle is configured to move the first locking pin via the first rod control cable between a first position in which the first locking pin locks the first rod in place relative to the first cylinder and a second position in which the first rod is able to move relative to the first cylinder, and wherein the rod control handle is configured to move the second locking pin via the second rod control cable between a first position in which the second locking pin locks the second rod in place relative to the second cylinder and a second position in which the second rod is able to move relative to the second cylinder.

7. The apparatus of claim 1, wherein the rod control device comprises a rod locking apparatus configured to permit an operator of the apparatus to selectively lock the first and second extendible rods in their respective retracted positions, unlock the first and second extendible rods to permit the first and second extendible rods to move from their respective retracted positions to their respective extended positions, and to lock the first and second extendible rods in their respective extended positions.

8. The apparatus of claim 1, wherein the first side frame is approximately U-shaped and the second side frame is approximately U-shaped.

9. The apparatus of claim 1, wherein each of the first and second side frames include a side support bar and a bottom support bar, and the first extendible rod is coupled to the side support bar and bottom support bar of the first side frame and the second extendible rod is coupled to the side support bar and the bottom support bar of the second side frame.

10. The apparatus of claim 1, wherein the safety belt is coupled to the at least one back support bar.

11. The apparatus of claim 1, wherein the seat is moveable between a first position in which it is approximately horizontal and configured to support the occupant and a second position in which it is approximately upright.

12. The apparatus of claim 1, wherein the rear tires are pneumatic.

* * * * *